Patented June 14, 1927.

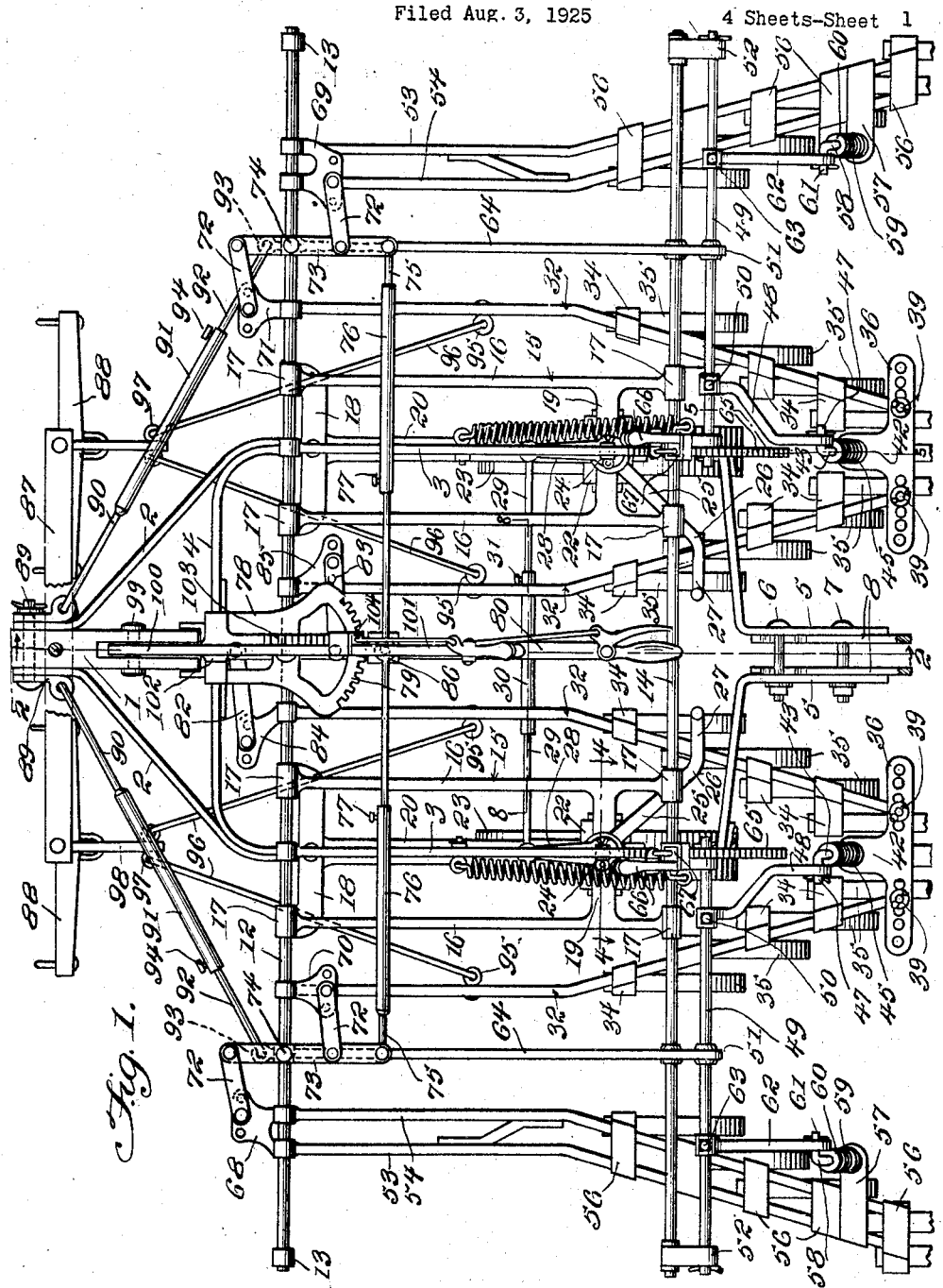

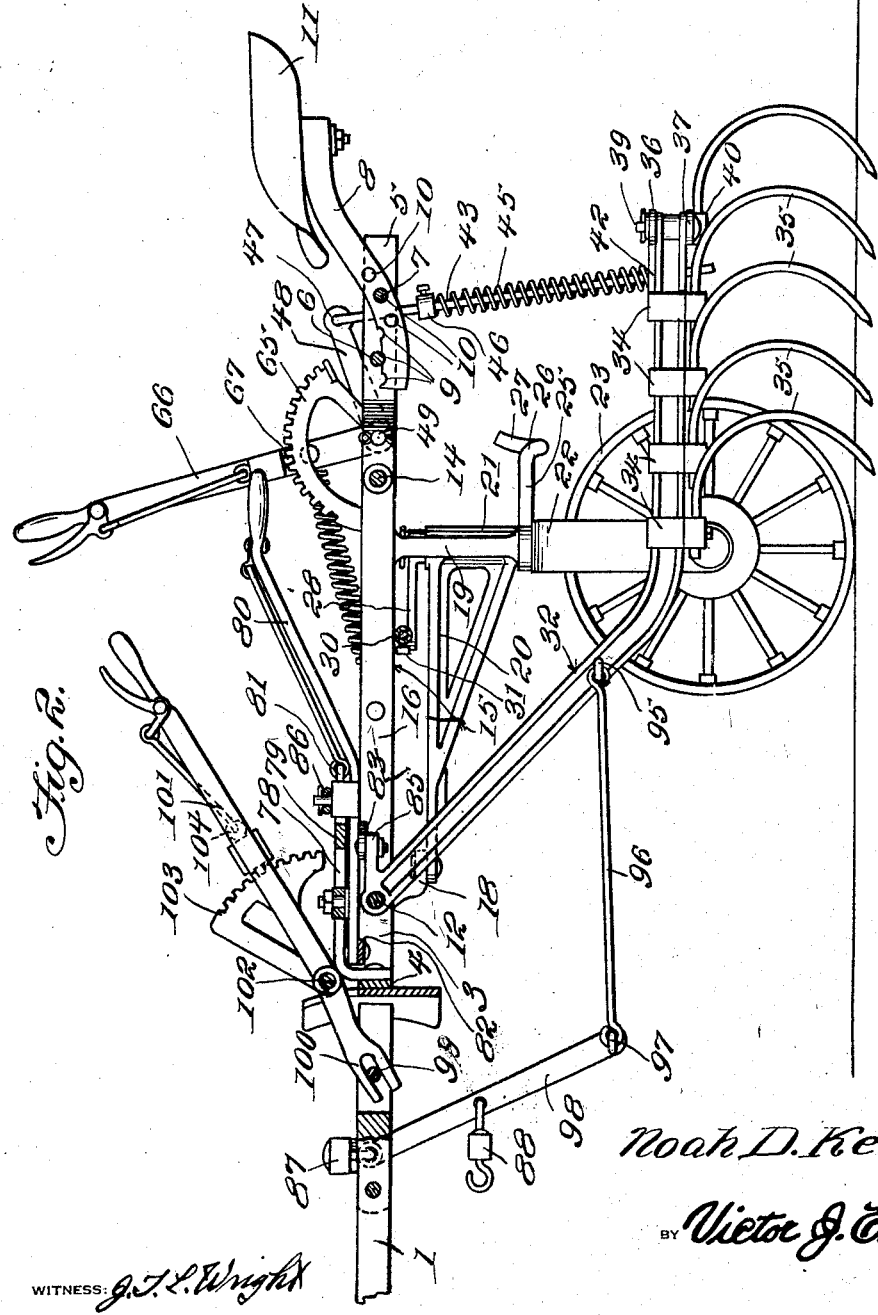

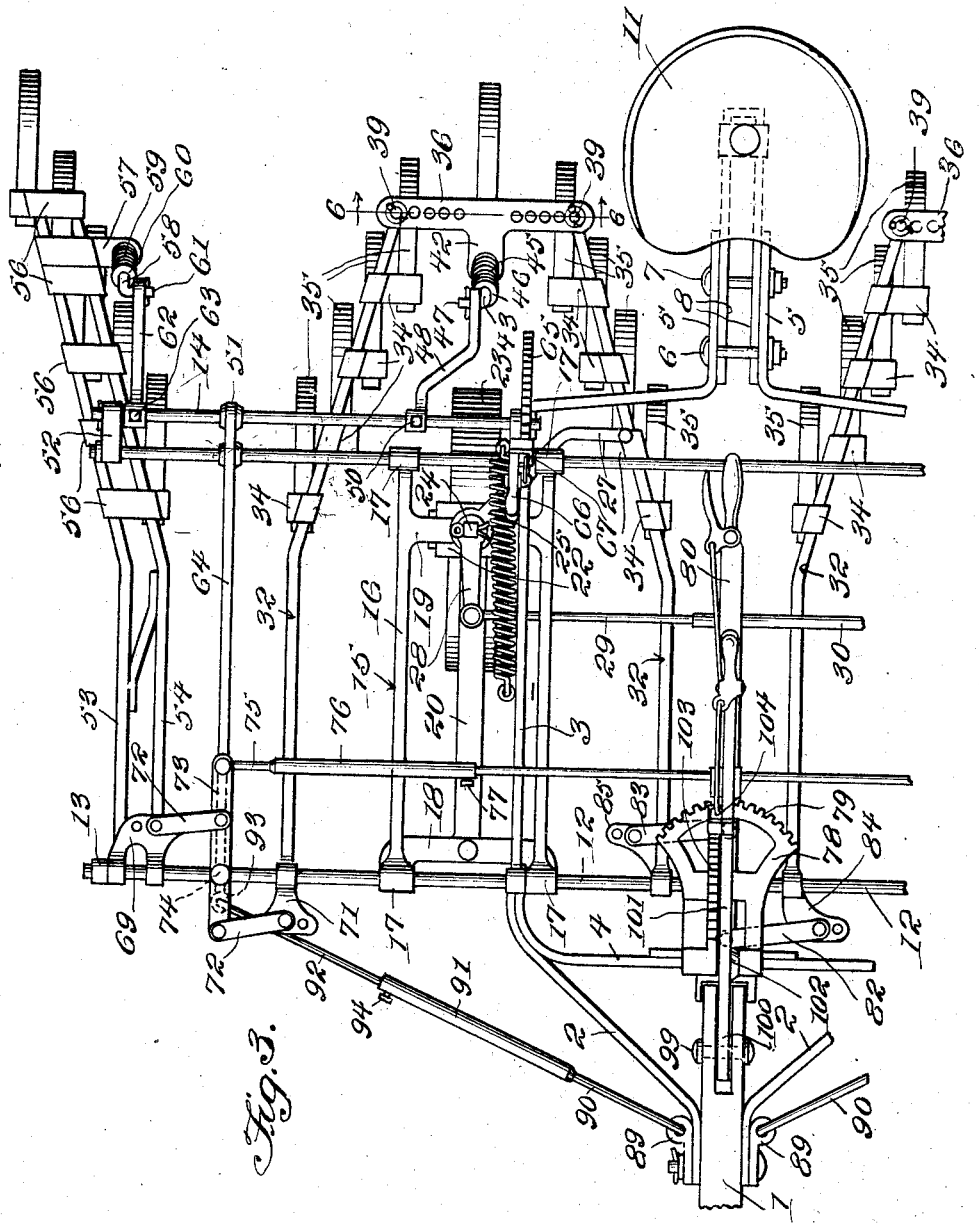

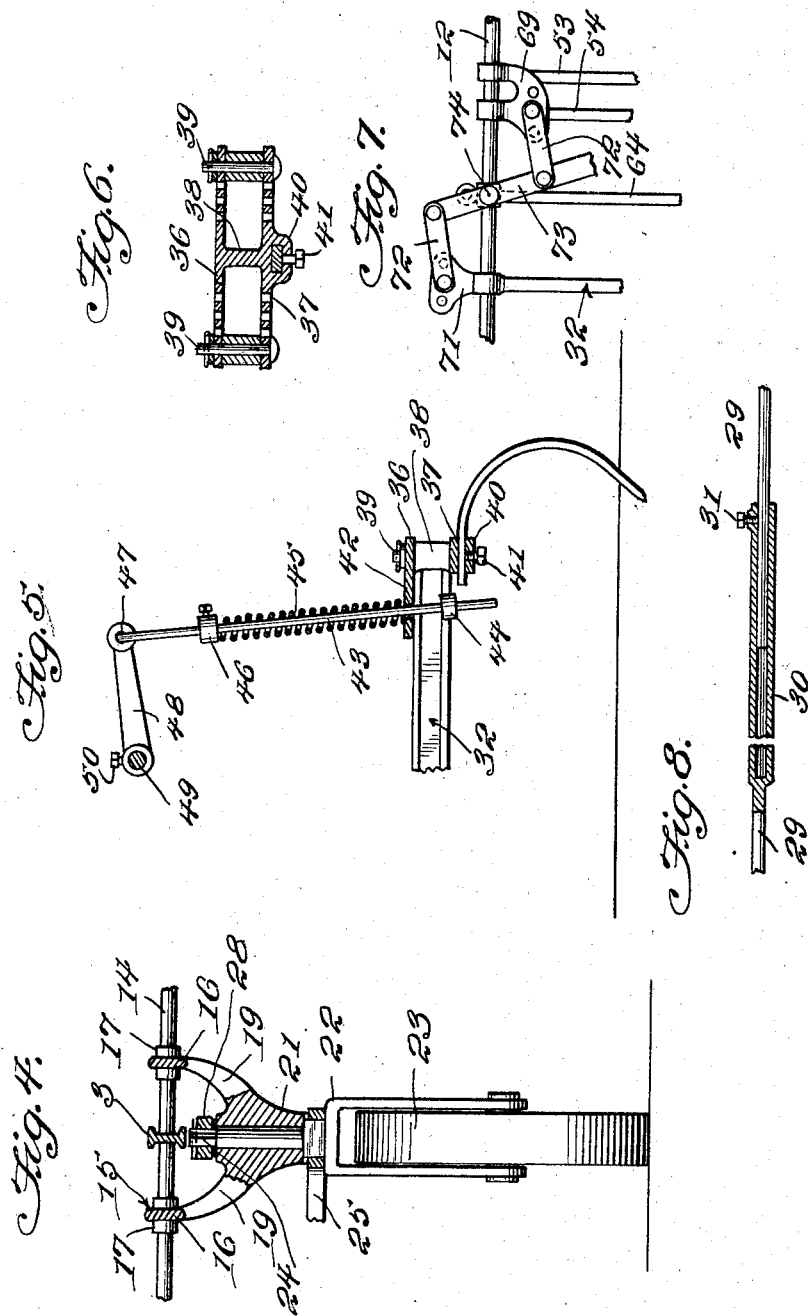

1,632,706

UNITED STATES PATENT OFFICE.

NOAH D. KERN, OF NEW ALBANY, OHIO.

CULTIVATOR.

Application filed August 3, 1925. Serial No. 47,941.

My present invention has reference to an agricultural device.

My object is the provision of a device of this character in which cultivator or plow carrying beams are effectively mounted on a frame in a manner to permit of the lateral adjustment of such beams so that the implements carried thereby may be brought close together or spread apart to permit of the device being employed for a plurality of agricultural purposes, and further wherein the beams are vertically adjustable.

A further object is the provision of an agricultural device in which plow or cultivator carrying beams are adjustable with respect to each other, and wherein the supporting wheels for the frame of the implement are mounted in such manner that the same can be readily turned by the driver so that the implement may be properly directed in its course, and further wherein the adjusting means is likewise conveniently located with respect to the driver.

A further object is the provision of an agricultural implement of this type characterized by simplicity of construction, strength and rigidity, together with reliability and efficiency in practical use.

To the attainment of the foregoing, the invention consists in the improvement as hereinafter described and definitely claimed.

In the drawings:

Figure 1 is a top plan view of the improvement.

Figure 2 is a sectional view on the line 2—2 of Figure 1.

Figure 3 is a fragmentary plan view showing the parts in spread condition.

Figure 4 is a sectional view on the line 4—4 of Figure 1.

Figure 5 is a detail sectional view approximately on the line 5—5 of Figure 1.

Figure 6 is a sectional view on the line 6—6 of Figure 3.

Figure 7 is a detail plan view.

Figure 8 is a sectional view approximately on the line 8—8 of Figure 1.

Referring now to the drawings in detail, the numeral 1 designates the tongue of the improvement. In the showing of the drawings the device is constructed to be drawn by draft animals, but it is obvious that the same may be propelled by a tractor.

Secured to the sides of the tongue 1 are the straight ends of angularly disposed metal members 2. The free ends of these members 2 are connected to the outer side of the substantially rectangular upper frame member of the improvement. The parallel sides of the frame member are indicated by the numeral 3, and the outer connecting element by the numeral 4. The opposite end of the frame is split to provide parallel rearwardly extending arms 5. The arms 5 are connected together and held in spaced relation by spaced bolts 6 and 7. The arched arms of the seat supporting frame 8 are provided with spaced openings, through one aligning pair of which the bolt 7 passes. The arms 8 of the seat support have their upper rounded edges provided with notches 9 spaced equi-distantly with respect to the openings 10. One pair of aligning notches underlie and receive therein the bolt 6. As the bolt 7 is removably associated with the arms 5 of the frame, the seat 11 may be adjusted on said frame, as will, it is thought, be readily understood.

Fixedly secured to the side members 3 of the frame, directly to the rear of the connecting element 4 for the arms of the said frame, there is a rod 12. This rod is of a determined length and extends a predetermined and equal distance beyond the sides 3 of the frame. The outer ends of the rod 12 have preferably removably secured thereon heads 13.

Secured to the said side members 3 of the frame, adjacent to the rear thereof, there is a second rod 14 arranged in parallelism with and of a length equalling that of the rod 12.

The rods 12 and 14 are round in cross section, and mounted for slidable movement on the said rods there are what I will term auxiliary frames 15. Each of these frames comprises parallel longitudinal side members 16 that have their ends formed with bearings 17 for the rods 12 and 14. By reference to the drawings, it will be noted that the inner side members of the respective frames 15 are disposed inwardly of the sides 3 of the fixed frame, so that the sliding movement of the frames 15 in an outward direction on the rods 12 and 14 will be limited by the contact of the bearing 17 with the said side members 3 of the fixed frame. Likewise the inward movement of the slidable frames 15 will be limited by the contact of the outer bearing 17 with the outer sides 3 of the fixed frame.

The sides 16 of the slidable frames 15, at the forward end thereof, are connected together by a cross piece 18, and the said side members, adjacent to the rear thereof, are integrally formed with a cross connecting piece 19. Centrally pivoted to the outer cross piece 18 of the frames 15 there is a rearwardly extending plate 20. The plates are preferably in the nature of castings, having their rear portions substantially V-shaped, and terminating each in a hub 21. Journaled through each of the hubs 21 there is the upstanding stem on the yoke-like mount 22 of the ground wheels 23 of the device. The upper ends of the stems for the wheel mounts are squared in cross section, as indicated by the numeral 24. Fixed on the said squared ends of the stems there are rearwardly extending angularly disposed arms 25 that have their ends offset inwardly and upturned, as at 26. The offset portions 27 provide rests for the feet of the driver of the device, and it is obvious that by a foot pressure upon either one of said foot rests or pedals the wheels 23 will be turned. Obviously it is necessary that both wheels 23 turn in the same direction, and therefore, I fix on the said squared ends 24 of the stems for the wheel mounts, arms 28 which are directed toward the front of the device and arranged in parallelism with the plates or castings 20 and directly thereover. Pivotally secured to the outer end of each arm 28 there is a rod 29. The rods 29 are directed toward each other, and fixed to the ends of one of the said rods there is a tubular member 30 in which the end of the second rod is telescopically received. The tubular member 30 is provided with adjustable means 31 for binding the last mentioned rod therein.

The plow or cultivator beams are arranged in gangs at the opposite sides of the center of the fixed frame. In the showing of the drawings, the improvement is provided with six such beams, three to each side of the center of the fixed frame. As the outer beams are of a slightly different construction from the inner beams, the construction of the latter and the arrangement of the same on the device will be first described. Each pair of inner beams has its ends inclined toward each other, as clearly disclosed by the drawings. Each of these beams is broadly indicated by the numeral 32, the same having its forward end upwardly inclined and provided with a bearing that receives the rod 12 therethrough. The lower and straight end of each beam has secured thereto by adjustable and removable clamps 34, cultivator or plow shovels 35. As stated, the rear and straight ends of the beams are disposed at angles with respect to each other so that the shovels 35 are arranged out of alignment with each other. The outer ends of the respective pairs of beams are connected together by a clevis of a particular and peculiar construction, a cross section of which being illustrated in Figure 6 of the drawings. The clevis includes upper and lower plates 36 and 37, connected together by a central member 38. From the center the plates are provided with aligning openings, and the plates are spaced to receive therebetween the socket ends of the cooperating pairs of beams. A pintle 39 passes through one pair of aligning openings and through the socket ends of the beams. In this manner the ends of the cooperating pairs of beams may be adjusted with respect to each other. The lower plate 37 is centrally formed with a lug 40 that has a central opening therethrough and through this opening there is passed the shank of a cultivator or of a plow shovel. Binding means 41 hold the cultivator or shovel elements in the boss.

The upper plate 36 of each of the clevises is formed with a central inwardly extending portion 42 provided with an opening whose wall is preferably flared. Through the openings in each of the extensions or arms 42 there is passed a rod 43. The lower end of this rod has adjustably secured thereon a stop element 44, and the rod is surrounded by a spring 45 which bears against the arm 42. An adjustable element 46 is arranged on each of the rods 43 for tensioning the springs 45. The upper end of each rod 43 is offset to provide a finger 47 that is received through the eye end of a link 48, and each of the said links has received through its free end a rod 49. Suitable binding means 50 hold the links on the rods 49. The rods 49 are in the nature of shafts, and the respective shafts find bearings in lugs 51 that extend from the socket ends of the outer arms of the slidable frames 15, and likewise in bearing members 52 which extend from the ends of the rods 14.

The outer or end beams are substantially constructed similar to the inner beams except that the end beams comprise in reality two spaced and connected beams 53—54. These beams have their front angle ends provided with slots through which the rod 12 is received. The outer ends of the beams are disposed at outward angles with respect to the center of the device and have adjustably clamped thereon by means 56, cultivator points or plow shovels. Between the outer clamp and the clamp next thereto, there is secured on the beam a bar 57. Each of these bars, at the inwardly extending end thereof, has an opening through which is passed a rod 58, of a similar construction to the rods 43. The rods 58 have on their lower ends stop elements, and on their outer portions springs 59 which contact between the plates 57 and stop elements 60 on the said rods. The upper or outer end of each rod has an offset finger 61 received through one end of a link 62, the opposite end of the links receiving the respective shafts 49 therethrough, while binding elements 63 hold the said links on the said shafts.

Fixed on the rods 12 and 14, between the end beams and the intermediate beams adjacent to said end beams, there are bars 64. The bars project beyond the rods 14, and have fixed thereon toothed segments 65. Fixed on each of the shafts 49 there is an upwardly directed lever 66. Each of the levers is provided with handle operated spring influenced dogs 67 to engage the teeth of the arched racks 65. The levers 66 are conveniently located with respect to the driver and it will be apparent that by swinging the said levers either or both series of shovel carrying beams may be vertically adjusted with respect to the fixed frame of the improvement.

The outer or end beams have at their socket ends through which the rod 12 passes, oppositely directed brackets 68 and 69, respectively. The beams 32, adjacent to the said end beams, are likewise provided at their socket ends with reversely disposed brackets 70 and 71, respectively. By reference to the drawings it will be noted that the brackets on the adjacent beams extend in opposite directions, and adjustably pivoted to the adjacent pairs of brackets there are links 72, respectively. The links are directed toward each other and each pair of said links overlies and is pivotally connected to a plate 73. These plates, centrally between their connection with the links 72 are pivoted, as at 74, to the fixed rod 12. The bar 73 extends a suitable distance rearwardly from the inner link 72 and have pivotally secured to their ends rods 75. The rod 75 may comprise any desired number of sections, and preferably fixedly secured on the end sections there are tubular members 76 in which the ends of the central section is received. Suitable binding means 77 hold the central rod section in the tubular or socket member 76.

Fixedly secured centrally on the elements 4 of the fixed frame there is the offset or angle end of a horizontally disposed plate 78. The plate 78 is directed toward the rear of the machine, and terminates in a segmental rack 79. Pivoted to the plate 78 there is a lever 80. This lever carries a spring influenced handle actuated dog 81 to engage with the teeth of the segmental rack 79. The lever, at points equi-distant from its pivotal connection to the plate 78, has loosely or pivotally secured thereto oppositely directed links 82 and 83, respectively. The central or intermediate pair of beams 32 are provided with on their socket ends through which pass the rod 12, oppositely directed brackets 84 and 85, respectively. The links 82 and 83 are respectively adjustably secured to the brackets 84 and 85.

The lever has a loose connection 86 with the intermediate member of the sectional rod 75. By swinging the lever 80 the plow beams will be simultaneously moved on the rod 12. The swinging of the lever also causes the plow beams, incident to their particular and peculiar connection with the links and plates associated therewith, to bring the said beams close to each other or to spread the said beams a determined distance away from each other. The advantages of this arrangement will be fully apparent to those skilled in the art to which such inventions relate. With such a construction the device may be used as a gang plow, as a side or as a straddle row cultivator and may be likewise successfully employed for other useful agricultural purposes.

Pivotally secured to the tongue 1 there is a double tree 87, while the single trees are indicated by the numeral 88. Below the single tree there is secured on the sides of the tongue 1, eye carrying brackets 89. Pivotally secured in the eye of each of the brackets 89 there is the offset end of a rod 90. The rods 90 are disposed at opposite angles with respect to each other and have their outer ends formed with tubular or socket portions 91. Received in the sockets 91 there are rod members 92 which have their outer ends pivotally connected to eye or bearing members 93 on the rod 12, directly below the plates 73. Binding means 94 hold the rods 92 in the sockets 91. These adjustably connected rods serve as a brace for the rod 12.

In order to effectively brace the inner cooperating pairs of beams 32, I provide the inner face of each of said beams with an eye member 95 to which is connected the offset end of a rod 96. The adjacent pairs of rods are inclined toward each other and have their upper ends secured in eyes 97 which extend from the sides of bars 98, each of said bars being hung from the ends of the double tree 87, and it is to these bars 98 that the single trees 88 are connected. Thus the draft of the animals is directly placed on the intermediate beams so that the cultivator teeth or shovels will be positively directed into their work.

The rear end of the tongue 1 is bifurcated and has passed therethrough a pin 99. Received in the bifurcation there is the forked end 100 of a lever 101, the said forked end straddling the pin 99. The lever 101 is pivotally secured, as at 102, to the central portion of the element 4 of the fixed frame. Rigidly secured to the element 4 there is a vertically disposed arched rack 103, while the lever 101 carries a handle operated spring influenced dog 104 to engage with the teeth of the rack. By providing the lever 101 the frame of the improvement may be vertically adjusted from the harness of the draft animals attached thereto. This is also true when the frame is connected to a tractor.

Of course, the operator first adjusts the beams to regulate the plowing, cultivating or harrowing desired, and thereafter the beams are simultaneously adjusted by the operation of the levers as above described, when the shovels or teeth are to enter the ground at different desired angles or when the shovels are to be adjusted toward or away from each other.

The simplicity and advantages of my construction will, it is thought, be perfectly apparent to those skilled in the art to which such inventions relate when the foregoing description is carefully read in connection with the accompanying drawings and while I have illustrated a satisfactory embodiment of my improved device, my features of invention are capable of extended application and I do not wish to be limited to the specific structure herein shown and described.

The gangs are lifted approximately 16 or 18 inches from the center. The coil springs are attached to the levers 66 just below the rack 65 and fastened to the frame so as to ease the lift. A locking device may be provided for holding one wheel rigid when the other is in motion and the device may be provided with fenders while, of course, the regular shovel shanks instead of the spring toothed shanks may be employed.

Having described the invention, I claim:—

1. In an agricultural device, a frame, front and rear rods secured to and extending laterally from the frame, auxiliary frames supported on the rods, wheel mounts journaled in bearings in the auxiliary frames, adjustable means connecting the mounts, a foot pedal associated with each of the mounts, plow carrying beams hung from the front rod, and arranged in series between and to the opposite sides of the main frame, oppositely directed brackets on the adjacent pairs of outer beams, links connected to said brackets, lever members pivoted to the front rod, adjustable means connecting the levers, oppositely directed brackets on the inner pair of beams, links pivoted thereto, a pivotally supported lever to which the last mentioned links are connected, links connecting said lever and the first mentioned levers, a segmental rack fixed on the frame, a spring influenced handle operated dog on the last mentioned lever engageable with the teeth of the rack, whereby the series of beams may be adjusted toward or away from each other, clevises adjustably connecting the rear ends of the respective pairs of beams, spring influenced rods slidable through the clevises rotatable shafts, and arms fixed on the shafts in which the ends of said rods are pivoted, levers fixed on the said shafts, each of said levers having a spring influenced hand operated dog and toothed segments supported from the rear bar on which said segments are secured, all as and for the purpose set forth.

2. In an agricultural device, a frame having a tongue, front and rear rods secured to and extending laterally from the frame, auxiliary frames supported on the rods, wheel mounts journaled in bearings in the auxiliary frames, adjustable means connecting the mounts, a foot pedal associated with each of the mounts, plow carrying beams hung from the front rod, and arranged in series between and to the opposite sides of the main frame, oppositely directed brackets on the adjacent pairs of outer beams, links connected to said brackets, lever members pivoted to the front rod, adjustable means connecting the levers, oppositely directed brackets on the inner pair of beams, links pivoted thereto, a pivotally supported lever to which the last mentioned links are connected, links connecting said lever and the first mentioned levers, a segmental rack fixed on the frame, a spring influenced handle operated dog on the last mentioned lever engageable with the teeth of the rack, whereby the series of beams may be adjusted toward or away from each other, adjustable brace means between the sides of the tongue and the outer bar, and means carried by the shafts and loosely connected with the rear ends of the beams for vertically adjusting the respective series of beams.

NOAH D. KERN.